(12) United States Patent
Petricek et al.

(10) Patent No.: US 7,612,603 B1
(45) Date of Patent: Nov. 3, 2009

(54) SWITCHING FREQUENCY CONTROL OF SWITCHED CAPACITOR CIRCUIT USING OUTPUT VOLTAGE DROOP

(75) Inventors: Shea Lynn Petricek, Yokohama (JP); Kun Xing, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 9 days.

(21) Appl. No.: 11/758,513

(22) Filed: Jun. 5, 2007

Related U.S. Application Data

(60) Provisional application No. 60/886,368, filed on Jan. 24, 2007.

(51) Int. Cl.
*H02M 3/06* (2006.01)
(52) U.S. Cl. ............................ 327/530; 327/306; 363/62; 307/109
(58) Field of Classification Search ................. 327/306, 327/308, 309, 318, 323, 530, 536–538, 543, 327/548; 363/62; 307/109, 110
See application file for complete search history.

(56) References Cited

U.S. PATENT DOCUMENTS

| | | | | |
|---|---|---|---|---|
| 5,457,421 A | * | 10/1995 | Tanabe | 327/530 |
| 7,099,167 B2 | * | 8/2006 | Fujise | 363/62 |
| 2004/0136213 A1 | * | 7/2004 | Fujise | 363/62 |
| 2007/0296383 A1 | * | 12/2007 | Xu et al. | 323/282 |
| 2008/0157723 A1 | * | 7/2008 | Xing et al. | 320/164 |
| 2008/0239772 A1 | * | 10/2008 | Oraw et al. | 363/60 |

* cited by examiner

*Primary Examiner*—Lincoln Donovan
*Assistant Examiner*—Patrick O'Neill
(74) *Attorney, Agent, or Firm*—Gary R. Stanford

(57) ABSTRACT

A frequency control circuit including a controlled oscillator and an amplifier circuit is disclosed for providing a clock signal to a switched capacitor circuit which divides an input voltage to provide an output voltage. The controlled oscillator has a frequency control input receiving a frequency control signal and an output for providing the clock signal at a frequency based on the frequency control signal. The amplifier circuit has an input for receiving the output voltage and an output providing the frequency control signal based on droop of the output voltage. In one embodiment, the amplifier circuit adjusts the frequency control signal to optimize efficiency of the switched capacitor circuit over a voltage range of the output voltage, which changes based on load level.

18 Claims, 1 Drawing Sheet

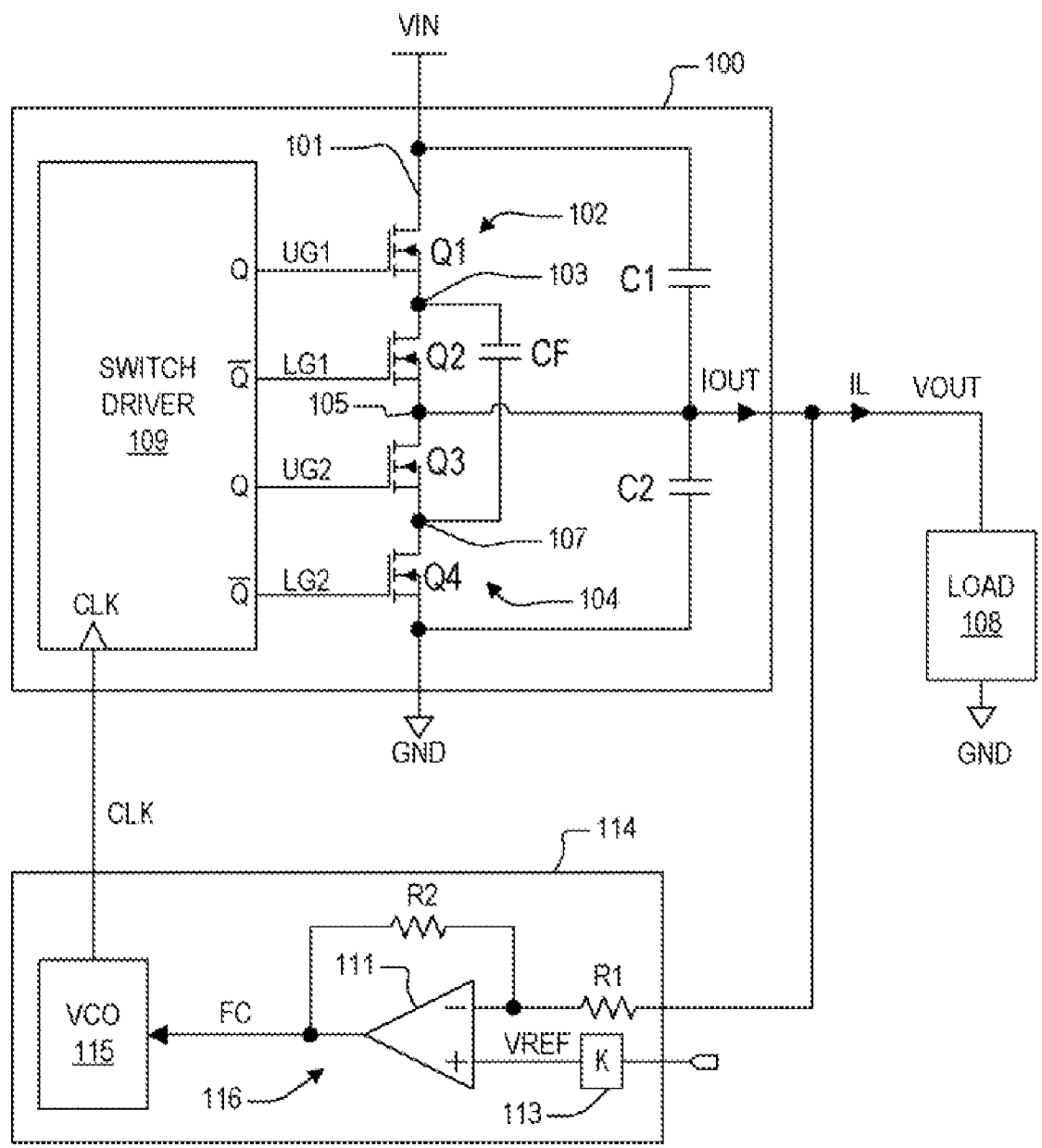

US 7,612,603 B1

SWITCHING FREQUENCY CONTROL OF SWITCHED CAPACITOR CIRCUIT USING OUTPUT VOLTAGE DROOP

CROSS-REFERENCE TO RELATED APPLICATIONS

This application claims the benefit of U.S. Provisional Application Ser. No. 60/886,368, filed on Jan. 24, 2007, which is herein incorporated by reference for all intents and purposes.

BACKGROUND OF THE INVENTION

1. Field of the Invention

The present invention relates to power electronics, and more particularly to controlling switching frequency of a switched capacitor circuit using output voltage droop.

2. Description of the Related Art

Electronic circuits use a variety of voltage levels suitable for various purposes. Lower voltage levels are suitable for smaller devices to prevent damage or to reduce power. A power or voltage converter is often used to reduce a higher voltage to a lower voltage level, such as a conventional buck converter or the like. A buck converter, however, has several disadvantages, such as diode reverse recovery, inductor power loss, etc. Switched capacitor circuits, such as capacitor voltage dividers, have also been used to reduce voltage level and do not have many of the disadvantages of conventional converters. It is desired to maximize efficiency of switched capacitor circuits within an electronic circuit.

BRIEF DESCRIPTION OF THE DRAWING

The benefits, features, and advantages of the present invention will become better understood with regard to the following description, and accompanying drawing in which the sole FIGURE is a schematic and block diagram of a switched capacitor voltage divider and a frequency control circuit implemented according to an exemplary embodiment for controlling the frequency of the capacitor voltage divider based on output voltage droop.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The sole FIGURE is a schematic and block diagram of a switched capacitor voltage divider 100 providing power via an output voltage VOUT to a load 108, and a frequency control circuit 114 implemented according to an exemplary embodiment for controlling the frequency of the capacitor voltage divider 100 based on output voltage droop of the output voltage VOUT. The capacitor voltage divider 100 includes four electronic switches Q1, Q2, Q3 and Q4 coupled in series between an input voltage VIN and a reference node, such as ground (GND). In the illustrated embodiment, the electronic switches Q1-Q4 are each configured as an N-channel metal oxide semiconductor, field-effect transistor (MOSFET), although other types of electronic switches are contemplated (e.g., P channel devices, other types of FETs, other types of transistors, etc.). Q1 has a drain coupled to an input node 101 providing the input voltage VIN and a source coupled to a first phase node 103. Q2 has a drain coupled to phase node 103 and a source coupled to an output node 105 developing the output voltage VOUT. Q3 has a drain coupled to the output node 105 and a source coupled to a second phase node 107. Q4 has a drain coupled to the phase node 107 and a source coupled to GND. A "flying" capacitor CF is coupled between the phase nodes 103 and 107. The electronic switches Q1 and Q2 form the first phase node 103 and the electronic switches Q3 and Q4 form the second phase node 107, where the phase nodes 103 and 107 are used for selectively coupling the flying capacitor CF. A first output capacitor C1 is coupled between input and output nodes 101 and 105 (between VIN and VOUT) and a second output capacitor C2 is coupled between the output node 105 and GND. An output current IOUT is provided from the output node 105. The load 108 is shown coupled between the output node 105 and GND and a load current IL is provided to the load 108.

The capacitor voltage divider 100 includes a switch driver circuit 109 having a clock input (CLK) receiving a clock signal CLK from the frequency control circuit 114, a first output providing a first upper gate signal UG1 to the gate of Q1, a second output providing a first lower gate signal LG1 to the gate of Q2, a third output providing a second upper gate signal UG2 to the gate of Q3, and fourth output providing a second lower gate signal LG2 to the gate of Q4. The switch driver circuit 109 is configured to drive the control inputs of the electronic switches Q1-Q4, such as, for example, a MOSFET gate driver circuit for driving the gates of the switches Q1-Q4 when implemented as MOSFETs. The switch driver circuit 109 drives the upper gate signals UG1 and UG2 high to turn on the switches Q1 and Q3 when the CLK signal indicates an active state (e.g., at a high logic level), and drives the lower gate signals UL1 and UL2 high to turn on the switches Q2 and Q4 when the CLK signal indicates an inactive state (e.g., at a logic low level). The switch driver circuit 109 also operates to ensure that the upper switches Q1 and Q3 are not turned on at the same time as the lower switches Q2 and Q4, and vice-versa. For example, the switches Q2 and Q4 are turned off before the switches Q1 and Q3 are turned on, and the switches Q1 and Q3 are turned off before the switches Q2 and Q4 are turned on, and so on. The switches Q1 and Q3 form a first switching circuit 102 as controlled by the switch driver circuit 109 for coupling the flying capacitor CF in parallel with the capacitor C1 and the switches Q2 and Q4 form a second switching circuit 104 as controlled by the switch driver circuit 109 for coupling the flying capacitor CF in parallel with the capacitor C2, as further described below.

The frequency control circuit 114 includes an amplifier circuit 116 including resistors R1 and R2, an amplifier 111 and a gain circuit 113, and a voltage controlled oscillator (VCO) 115 providing the CLK signal. The frequency control circuit 114 is responsive to VOUT for controlling the frequency of the CLK signal in response to voltage droop of VOUT. The output node 105 is coupled to one end of the resistor R1, having its other end coupled to an inverting input of the amplifier 111 and to one end of the resistor R2. The other end of resistor R2 is coupled to the output of the amplifier 111, which provides a frequency control (FC) signal. The amplifier 111 may be implemented in any suitable manner, such as a differential amplifier or operational amplifier or the like. VIN is provided to an input of a gain circuit 113, having its output developing a reference voltage VREF provided to a non-inverting input of the amplifier 111. The gain circuit 113 has a gain K so that the output of the gain circuit 113 is VREF=K*VIN (in which an asterisk "*" denotes multiplication). In one embodiment, K=½ or 0.5. The FC signal is provided to the voltage control input of the VCO 115, having its output providing the CLK signal to the clock input of the switch driver circuit 109.

In operation, the CLK signal is generally held to a fixed duty cycle (e.g., 50% duty cycle) and may be configured to have a predetermined minimum or nominal frequency level. In one embodiment, the minimum frequency of CLK is approximately 20 kiloHertz (kHz) or the like, although alternative frequency levels are contemplated. The voltage of VOUT may be configured to have any suitable voltage level up to the voltage level of VIN. In the illustrated embodiment, the voltage level of VOUT is approximately one-half (½) of VIN. At very low load or no-load conditions (e.g., IL is very small or essentially zero), VOUT is generally about ½ of VIN. As IL increases, VOUT "droops" and falls below one-half of VIN. In the illustrated embodiment, the gain K is generally set to a value to reflect the target ratio of VOUT/VIN in order to determine the amount of droop of VOUT. In an alternative embodiment, VREF is set to a fixed value.

The gain of the amplifier 111 of the frequency control circuit 114 is generally determined by the resistance values of the resistors R1 and R2 and the gain circuit 113 according to the following equation (1):

$$FC = \frac{R2}{R1}(K * VIN - VOUT) \quad (1)$$

in which the voltage of FC increases with a decrease of the voltage level of VOUT and vice-versa at a rate determined by the amplifier gain. The FC signal may have a minimum or zero voltage level under no-load or relatively low-load conditions so that the frequency of the CLK signal is at a nominal or initial frequency level (e.g., 20 kHz). As the load 108 increases causing an increase of the load current IL, the VOUT signal begins to droop from its initial nominal value. The output voltage droop of VOUT in response to increase of IL is generally due to losses within devices of the capacitor voltage divider 100. Over most of the useful current range of IL, the primary contributor to the output voltage droop of VOUT is the drain to source resistance, or RDSON, of the switches Q1-Q4 and the equivalent series resistance (ESR) of the capacitors CF, C1 and C2, among other factors. The frequency control circuit 114 responds to the drop of VOUT by increasing the voltage level of the FC signal. In particular, as VOUT drops, the voltage at the inverting input of the amplifier 111 drops relative to VREF at its non-inverting input, causing the amplifier 111 to increase the voltage level of FC at its output. The VCO 115 increases the frequency of the CLK signal in response to the voltage increase of FC. The frequency of the CLK signal, and thus the switching frequency of the capacitor voltage divider 100, is increased with increasing voltage level of FC. In this manner, as VOUT droops or decreases, the voltage of FC increases which increases the frequency of CLK to increase the switching frequency of the capacitor voltage divider 100.

The relative increase of FC with the decrease of VOUT is generally determined by the relative resistance values of R1 and R2 establishing the gain of the of the frequency control circuit 114. It has been observed and determined that the efficiency of the capacitor voltage divider 100 is affected by the switching frequency. It has been determined that under light load conditions in which IL is relatively low, the capacitor voltage divider 100 achieves higher system efficiency with lower frequency of the CLK signal. Likewise it has been determined that under heavy load conditions with increasing level of IL, the capacitor voltage divider 100 achieves higher system efficiency with higher frequency of the CLK signal. In order to maintain maximum or optimal efficiency across the full load range of IL, it is desirable to control the switching frequency based on the droop of VOUT, which is further based on the load current IL. The efficiency relationship of the capacitor voltage divider 100 with the full load range of IL (and the corresponding range of VOUT) and switching frequency is determined and the values of the resistors R1 and R2 are determined to adjust the frequency of CLK across the full load range of IL to maintain optimal efficiency across the load range. In this manner, the control scheme based on controlling switching frequency based on VOUT droop maintains an optimal level of efficiency across the full load range of IL for the capacitor voltage divider 100.

A frequency control circuit for providing a clock signal to a switched capacitor circuit which divides an input voltage to provide an output voltage according to one embodiment includes a controlled oscillator and an amplifier circuit. The controlled oscillator has a frequency control input receiving a frequency control signal and an output for providing the clock signal at a frequency based on the frequency control signal. The amplifier circuit has an input for receiving the output voltage and an output providing the frequency control signal based on droop of the output voltage. In one embodiment, the amplifier circuit adjusts the frequency control signal to optimize efficiency of the switched capacitor circuit over a voltage range of the output voltage.

The amplifier circuit may include a gain circuit having an input for receiving the output voltage and an output providing a reference voltage. The amplifier circuit determines the droop based on a difference between the reference voltage and the output voltage. The amplifier circuit further may include a controlled oscillator having a fixed duty cycle, and a gain circuit having an input for receiving the input voltage, an output providing a reference voltage and a gain based on the fixed duty cycle of the controlled oscillator.

A capacitor voltage divider according to one embodiment includes a switched capacitor circuit and a frequency control circuit. The switched capacitor circuit divides an input voltage on an input node to provide an output voltage on an output node based on a clock signal. The frequency control circuit has an input receiving the output voltage and an output providing the clock signal, where the frequency control circuit adjusts frequency of the clock signal based on droop of the output voltage.

In one embodiment, the frequency control circuit increases frequency of the clock signal with a decrease of the output voltage. In another embodiment, the frequency control circuit adjusts frequency of the clock signal to maximize efficiency of the switched capacitor circuit. The frequency control circuit may include an amplifier circuit and a controlled oscillator. The amplifier circuit has an input receiving the output voltage and an output providing a frequency control signal. The controlled oscillator has an input receiving the frequency control signal and an output providing the clock signal. The amplifier circuit may include a differential amplifier having a first input for sensing the output voltage, a second input receiving a reference voltage, and an output providing the frequency control signal. A gain circuit may be included with an input coupled to the input node and an output providing the reference voltage. In one embodiment, the clock signal has a fixed duty cycle and gain circuit has a gain based on the duty cycle.

The switched capacitor circuit may include a first capacitor coupled between the input and output nodes, a second capacitor coupled between the output node and a reference node, a flying capacitor, a first switching circuit which couples the flying capacitor in parallel with the first capacitor when the clock signal is at a first state, and a second switching circuit which couples the flying capacitor in parallel with the second capacitor when the clock signal is at a second state. The switched capacitor circuit may further include a switch driver having an input receiving the clock signal and outputs controlling the first and second switching circuits.

A method of optimizing efficiency of a switched capacitor circuit which divides an input voltage to provide an output voltage based on a clock signal according to one embodiment includes providing the clock signal with a fixed duty cycle, detecting droop of the output voltage, and adjusting frequency of the clock signal based on detected droop. The method may include increasing the frequency of the clock signal with corresponding decrease of the output voltage. The method may include multiplying the input voltage by a gain value to provide a reference voltage, amplifying a difference between the reference voltage and the output voltage to provide a frequency control signal, and adjusting the frequency based on the frequency control signal.

Although the present invention has been described in considerable detail with reference to certain preferred versions thereof, other versions and variations are possible and contemplated. For example, a switched capacitor voltage divider is used to illustrate maximizing efficiency by controlling switching frequency across the expected load range, yet it is appreciated that any type of switched capacitor circuit is contemplated including various types of capacitive charge pump systems. Also, although the duty cycle is described as being at 50%, the duty cycle of CLK may be adjusted to divide VIN by any suitable value to provide VOUT at a selected percentage of VIN. The reference voltage may be fixed rather than determined by gain circuit receiving the input voltage. If provided, the gain K of the gain circuit is adjusted accordingly so that the frequency control circuit accurately detects the relative error or droop of the VOUT signal to adjust the frequency of CLK to optimize efficiency of the switched capacitor circuit. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A capacitor voltage divider, comprising:
   a switched capacitor circuit which provides an input voltage on an input node to provide an output voltage on an output node based on a clock signal; and
   a frequency control circuit having an input receiving said output voltage and an output providing said clock signal, wherein said frequency control circuit continuously adjusts the frequency of said clock signal by an amount corresponding to the amount of droop of said output voltage.

2. The capacitor voltage divider of claim 1, wherein said frequency control circuit increases frequency of said clock signal with a decrease of said output voltage.

3. The capacitor voltage divider of claim 1, wherein said frequency control circuit comprises:

an amplifier circuit having an input receiving said output voltage and an output providing a frequency control signal; and
   a controlled oscillator having an input receiving said frequency control signal and an output providing said clock signal.

4. The capacitor voltage divider of claim 3, wherein said amplifier circuit comprises a differential amplifier having a first input for sensing said output voltage, a second input receiving a reference voltage, and an output providing said frequency control signal.

5. The capacitor voltage divider of claim 4, further comprising a gain circuit having an input coupled to said input node and an output providing said reference voltage.

6. The capacitor voltage divider of claim 5, wherein said clock signal has a fixed duty cycle and wherein said gain circuit has a gain based on said duty cycle.

7. The capacitor voltage divider of claim 3, wherein said amplifier circuit comprises:
   a differential amplifier having an inverting input, a non-inverting input receiving a reference voltage, and an output providing said frequency control signal as a voltage control signal;
   a first resistor having one end coupled to said output node and a second end coupled to said inverting input of said differential amplifier; and
   a second resistor having a first end coupled to said inverting input of said differential amplifier and a second end coupled to said output of said differential amplifier.

8. The capacitor voltage divider of claim 7, wherein said controlled oscillator comprises a voltage controlled oscillator.

9. The capacitor voltage divider of claim 3, wherein said controlled oscillator provides said clock signal with a fixed duty cycle, and provides said clock signal at a minimum frequency when said output voltage is at a nominal voltage level.

10. The capacitor voltage divider of claim 1, wherein said switched capacitor circuit comprises:
    a first capacitor coupled between said input and output nodes;
    a second capacitor coupled between said output node and a reference node;
    a flying capacitor;
    a first switching circuit which couples said flying capacitor in parallel with said first capacitor when said clock signal is at a first state; and
    a second switching circuit which couples said flying capacitor in parallel with said second capacitor when said clock signal is at a second state.

11. The capacitor voltage divider of claim 10, wherein said switched capacitor circuit further comprises a switch driver having an input receiving said clock signal and a plurality of outputs controlling said first and second switching circuits.

12. A switched capacitor voltage converter, comprising:
    a switched capacitor voltage divider which divides an input voltage to provide an output voltage based on an input clock signal, wherein said output voltage has a voltage droop based on output load current;
    a controlled oscillator having a frequency control input receiving a frequency control signal and an output for providing said clock signal at a frequency based on said frequency control signal; and
    an amplifier circuit having an input for receiving said output voltage and an output providing said frequency control signal which is continuously adjusted by an amount corresponding to the amount of said voltage droop of the output voltage.

13. The switched capacitor voltage converter of claim 12, wherein said amplifier circuit further comprises a gain circuit having an input for receiving said input voltage and an output providing a reference voltage, wherein said amplifier circuit determines said voltage droop based on a difference between said reference voltage and said output voltage.

14. The switched capacitor voltage converter of claim 12, wherein said amplifier circuit further comprises:
   said controlled oscillator having a fixed duty cycle; and
   a gain circuit having an input for receiving said input voltage, an output providing a reference voltage and having a gain based on said fixed duty cycle of said controlled oscillator;
   wherein said amplifier circuit determines said voltage droop based on a difference between said reference voltage and said output voltage.

15. The switched capacitor voltage converter of claim 12, wherein:
   said controlled oscillator comprises a voltage controlled oscillator; and
   wherein said amplifier circuit comprises:
      a gain circuit having an input for receiving said input voltage and an output;
      a first resistor having a first end receiving said output voltage and having a second end;
      a second resistor having a first end coupled to said second end of said first resistor and having a second end; and
      a differential amplifier having an inverting input coupled to said second end of said first resistor, a non-inverting input coupled to said output of said gain circuit, and an output coupled to said second end of said second resistor;
   wherein said differential amplifier provides said frequency control signal as an adjustable voltage signal to adjust frequency of said clock signal.

16. A method of controlling a frequency of a switched capacitor circuit to optimize efficiency, comprising:
   dividing an input voltage to provide an output voltage using a switched capacitor circuit which switches based on a clock signal;
   providing the clock signal with a fixed duty cycle;
   detecting an amount of droop of the output voltage; and
   continuously adjusting the frequency of the clock signal by an amount corresponding to the detected amount of droop.

17. The method of claim 16, wherein said adjusting frequency comprises increasing the frequency of the clock signal in response to increasing output voltage droop.

18. The method of claim 16, wherein:
   said detecting droop comprises:
      multiplying the input voltage by a gain value to provide a reference voltage; and
      amplifying a difference between the reference voltage and the output voltage to provide a frequency control signal; and
   wherein said adjusting frequency comprises adjusting the frequency based on the frequency control signal.

* * * * *